United States Patent
Chorvalli

(10) Patent No.: US 9,240,841 B2
(45) Date of Patent: Jan. 19, 2016

(54) METHOD AND SYSTEM FOR FREE-FIELD OPTICAL TRANSMISSION BY MEANS OF LASER SIGNALS

(75) Inventor: Vincent Chorvalli, Quint Fonsegrives (FR)

(73) Assignee: Airbus Defense and Space SAS, Les Mureaux (FR)

( * ) Notice: Subject to any disclaimer, the term of this patent is extended or adjusted under 35 U.S.C. 154(b) by 604 days.

(21) Appl. No.: 14/002,544

(22) PCT Filed: Mar. 1, 2011

(86) PCT No.: PCT/FR2011/050422
§ 371 (c)(1),
(2), (4) Date: Aug. 30, 2013

(87) PCT Pub. No.: WO2011/110771
PCT Pub. Date: Sep. 15, 2011

(65) Prior Publication Data
US 2013/0336661 A1 Dec. 19, 2013

(30) Foreign Application Priority Data
Mar. 8, 2010 (FR) ..................... 10 51649

(51) Int. Cl.
*H04B 10/00* (2013.01)
*H04B 10/516* (2013.01)
*H04B 10/118* (2013.01)

(52) U.S. Cl.
CPC ............ *H04B 10/516* (2013.01); *H04B 10/118* (2013.01)

(58) Field of Classification Search
USPC ................................. 398/118–131
See application file for complete search history.

(56) References Cited

U.S. PATENT DOCUMENTS

| 5,802,311 | A | * | 9/1998 | Wronski | 709/236 |
| 5,940,439 | A | * | 8/1999 | Kleider et al. | 375/225 |
| 5,983,383 | A | * | 11/1999 | Wolf | 714/755 |
| 6,148,423 | A | * | 11/2000 | Le Mouel et al. | 714/708 |
| 6,154,489 | A | * | 11/2000 | Kleider et al. | 375/221 |
| 6,240,274 | B1 | * | 5/2001 | Izadpanah | 455/39 |

(Continued)

FOREIGN PATENT DOCUMENTS

EP 1 592 153 A1 11/2005

OTHER PUBLICATIONS

Zhang W et al: "Short-Length Raptor Codes for Mobile Free-Space Optical Channels", Communications, 2009. ICC '09. IEEE International Conference on, IEEE, Piscataway, NJ, USA, Jun. 14, 2009, pp. 1-5, XP031506431, ISBN: 978-1-4244-3435-0.

(Continued)

*Primary Examiner* — Agustin Bello
(74) *Attorney, Agent, or Firm* — Patterson Thuente Pedersen, P.A.

(57) ABSTRACT

The invention relates to a method and system for free-field optical transmission by means of laser signals, including setting a rate for encoding information that is useful for transmission on the basis of variations in a signal receiving characteristic belonging to a single communication session. The encoding rate is preferably dynamically adjusted during the communication session. An optimized compromise is thereby created between a useful rate that is high and a post-decoding bit error rate that is low. The method and the related system enable atmospheric conditions that can disrupt laser signal transmission to be taken into account in real time when said laser signals pass through part of the earth's atmosphere.

30 Claims, 4 Drawing Sheets

(56) References Cited

U.S. PATENT DOCUMENTS

| | | | |
|---|---|---|---|
| 6,366,776 B1* | 4/2002 | Wright et al. | 455/427 |
| 6,477,669 B1* | 11/2002 | Agarwal et al. | 714/708 |
| 6,643,469 B1* | 11/2003 | Gfeller et al. | 398/162 |
| 6,928,603 B1* | 8/2005 | Castagna et al. | 714/786 |
| 6,954,891 B1* | 10/2005 | Jha | 714/776 |
| 6,970,651 B1* | 11/2005 | Schuster et al. | 398/131 |
| 7,263,651 B2* | 8/2007 | Xia et al. | 714/774 |
| 7,289,736 B1* | 10/2007 | Graves | 398/119 |
| 7,471,735 B2* | 12/2008 | Chen | 375/295 |
| 7,916,680 B2* | 3/2011 | Miller et al. | 370/315 |
| 8,116,632 B2* | 2/2012 | Miniscalco et al. | 398/118 |
| 8,122,323 B2* | 2/2012 | Leung et al. | 714/774 |
| 8,194,783 B2* | 6/2012 | Proctor, Jr. | 375/295 |
| 2002/0196506 A1* | 12/2002 | Graves et al. | 359/172 |
| 2003/0005385 A1* | 1/2003 | Stieger | 714/758 |
| 2003/0067657 A1* | 4/2003 | Dimmler et al. | 359/159 |
| 2005/0100339 A1* | 5/2005 | Tegge, Jr. | 398/125 |
| 2005/0238357 A1* | 10/2005 | Farrell | 398/119 |
| 2006/0024061 A1* | 2/2006 | Wirth et al. | 398/129 |
| 2007/0242955 A1* | 10/2007 | Kavehrad | 398/130 |
| 2013/0336661 A1* | 12/2013 | Chorvalli | 398/119 |

OTHER PUBLICATIONS

Kamal Harb, Changcheng Huang, Anand Srinivasan, Brian Cheng: "Intelligent Weather Aware Scheme for Satellite Systems", ICC 2008 Proceedings, 2008, pp. 1930-1936, XP002613006, ICC 2008.

* cited by examiner

METHOD AND SYSTEM FOR FREE-FIELD OPTICAL TRANSMISSION BY MEANS OF LASER SIGNALS

PRIORITY CLAIM

The present application is a National Phase entry of PCT Application No. PCT/FR2011/050422, filed Mar. 1, 2011, which claims priority from FR Application No. 10 51649 filed Mar. 8, 2010, said applications being hereby incorporated by reference herein in their entirety.

FIELD OF THE INVENTION

The invention relates to a method for optical transmission by means of laser signals, as well as an optical communications terminal which is adapted to carry out such a method.

BACKGROUND OF THE INVENTION

Communication by transmitting laser signals in free space (also referred to herein as "free-field") is well known, and is referred to as free-space laser communication. It consists of modulating a laser beam, transmitted by a transmitting terminal towards a receiving terminal, according to the useful or "payload" information to be transmitted. Because of the very small beam width of the laser beam, it is necessary to keep the transmitting terminal accurately pointed in the direction of the receiving terminal during a communication session. This maintaining of the pointing direction is called the tracking phase of the communication session. Actually, both terminals must be accurately and simultaneously pointed towards each other, in particular because each of them regularly sends beacon signals which are necessary to maintain the alignment between the pointing directions, even if one of the two terminals is not sending useful information at that moment.

When a communication laser beam passes through at least part of the Earth's atmosphere, this atmosphere can interfere with the propagation of the laser beam between the two terminals, and can consequently cause transmission errors in the payload information. Difficult atmospheric conditions can even cause a loss of the optical connection between the two terminals. Document U.S. Pat. No. 6,970,651 describes a method for preventing the loss of the optical link, which is based on the use of a specific sensor for detecting an atmospheric characteristic indicative of some of the weather conditions which could affect the propagation of laser signals.

Also, document US 2006/0024061 discloses a wavefront correction of laser signals received by one of the optical communication terminals, in order to reduce the disruptions caused by atmospheric turbulence. It is known that when an optical communication is established in which one of the terminals is located in the Earth's atmosphere and the other terminal is located in space, for example on board a satellite, the optical transmission from Earth to space has more disruptions than the optical transmission in the opposite direction.

SUMMARY OF THE INVENTION

In general, one object of the present invention is to improve the quality of a communication by means of laser beam transmission between two optical terminals.

More particularly, the invention aims to reduce the error rate which affects the payload information when this information is sent via the optical communication, without unnecessarily reducing the transmission rate of this payload information.

To this purpose, the invention proposes a method for free-space optical transmission by means of laser signals, between a first and a second optical communications terminal, wherein time variations are evaluated for a reception characteristic of first laser signals which are received by the first terminal and which originate from the second terminal. Useful information which is to be sent by the first terminal to the second terminal is encoded before transmission. The encoding rate for this useful information in second laser signals transmitted by the first terminal to the second terminal, is variable and is adjusted on the basis of the time variations in the reception characteristic of the first laser signals. This encoding rate is adjusted according to a decreasing function of the amplitude of the time variations in the reception characteristic of the first laser signals, said function possibly being a decreasing step function.

In the context of the invention, the decreasing function of the amplitude, including a decreasing step function, is understood to mean a function whose output values decrease or remain constant when the amplitude concerned, used as the input to the function, increases. In general practice, the amplitude of the variations of a characteristic is a positive number which measures the extent of these variations, this number being higher with larger absolute values of the variations.

The encoding rate of the useful information in the second laser signals is defined as the number of bits of this useful information before encoding, divided by the number of bits corresponding to the same useful information after encoding.

Thus, in the invention, the influence on the optical link of a medium intermediate between the two terminals is evaluated based on the signals received by one of the two terminals, namely the laser signals which are received by the first terminal and which are called the first laser signals. This information concerning the influence of the intermediate medium is then used to adapt the encoding rate of the laser signal transmission channel, for the useful information sent by the first terminal. The encoding rate used is reduced when a disruptive influence of the intermediate medium on the optical link is detected, which is greater.

In this manner, the quality of the transmission of the useful information from the first terminal to the second terminal is improved during the tracking phase of the communication session. In particular, the invention provides an improved compromise between obtaining a communication of sufficient quality and a high transfer rate in the transmission of the useful information.

In the invention, the reception characteristic of the first laser signals, of which the time variations are used to adjust the encoding rate, is a reception direction of the first laser signals, or a deviation between this reception direction of the first laser signals and an optical axis of the first terminal. Such reception characteristics can easily be measured, as can their time variations. In addition, they provide an efficient indicator of atmospheric turbulence along the path of the laser signals forming the optical link between the two terminals, as such turbulence is able to cause high error rates in the useful information received by the second terminal.

The invention is particularly useful when the first terminal is located on Earth or on board an aircraft which is within the Earth's atmosphere, and the second terminal is on board a spacecraft.

Several advantages of the invention result from using the laser communication signals received by one of the terminals in order to evaluate the influence of Earth's atmosphere on the optical link. One advantage is that it is not necessary to use a specific sensor to characterize the atmospheric conditions. Another is that the obtained characterization of atmospheric conditions concerns the part of the atmosphere actually traveled by the laser signals, along the entire path of these signals through the atmosphere. Thus local and space-limited disturbances present in the path of the laser signals are taken into account, while they would not be detected by a remote sensor or by sensors located in proximity to the terminals. Lastly, this information on the atmospheric conditions concerns the actual state of the atmosphere, and does not result from meteorological forecasts. Such forecasts are generally uncertain. In addition, their accuracy concerning the geographical location of the predicted phenomena is insufficient. Also, given that the time range for the atmospheric variations which disrupt an optical transmission is of the order of one second, these atmospheric variations are not predictable by known forecasting methods.

In preferred implementations of the invention, the amplitude of the time variations in the reception characteristic of the first laser signals may be evaluated by calculating a standard deviation for this characteristic.

Preferably, the reception characteristic of the first laser signals received by the first terminal is measured at a measurement frequency which may be greater than 100 Hz, and the amplitude of its time variations is evaluated at an analysis frequency which may be less than 10 Hz.

Again preferably, the amplitude of the time variations in the reception characteristic of the first laser signals may be evaluated repeatedly during a communication session. The encoding rate of the useful information in the second laser signals may then be adjusted in real time during the same communication session.

The invention also proposes a communications terminal for free-space transmission by means of laser signals, which comprises:
  a receiver of first laser signals originating from an external terminal;
  a transmitter of second laser signals, for transmitting useful information to the external terminal;
  a module for analyzing time variations in a reception characteristic of the first laser signals;
  a module for encoding the useful information, which is able to construct the second laser signals from this useful information with a variable encoding rate; and
  a module for selecting the encoding rate of the useful information in the second laser signals, which is able to adjust this encoding rate according to a decreasing function of the amplitude of the time variations in the reception characteristic of the first laser signals, said function possibly being a decreasing step function.

In the invention, the reception characteristic of the first laser signals is selected from among a reception direction of these first laser signals or a deviation between this reception direction and an optical axis of the terminal receiving the first signals.

Advantageously, the module for analyzing the time variations in the reception characteristic of the first laser signals may additionally be adapted for producing evaluations of a mean value of the received signal intensity of these first laser signals. In this case, the module for selecting the encoding rate of the useful information in the second laser signals can additionally be adapted for adjusting this encoding rate as a function of the mean value of the received signal intensity of the first laser signals, such that this encoding rate is the same or greater when the mean value of the received signal intensity of the first laser signals is itself greater, at a same amplitude of time variations in the reception characteristic of the first laser signals.

Such a communication terminal is adapted for carrying out a method for optical transmission according to the invention, as described above and possibly with the improvements which have been indicated.

In addition, it may be adapted for transmitting the second laser signals towards the external terminal at a channel transmission rate which is greater than or equal to 10 Mbps (megabits per second), the channel transmission rate being equal to the transmission rate for the useful information divided by the encoding rate.

BRIEF DESCRIPTION OF THE DRAWINGS

Other features and advantages of the invention will become apparent from the following description of some non-limiting examples, with reference to the accompanying drawings in which:

FIGS. 3b and 3c are diagrams indicating the variations in the bit error rate of the signals received, respectively before and after decoding, for the transmission sequence of FIG. 3a.

DETAILED DESCRIPTION OF THE DRAWINGS

Figure 1:
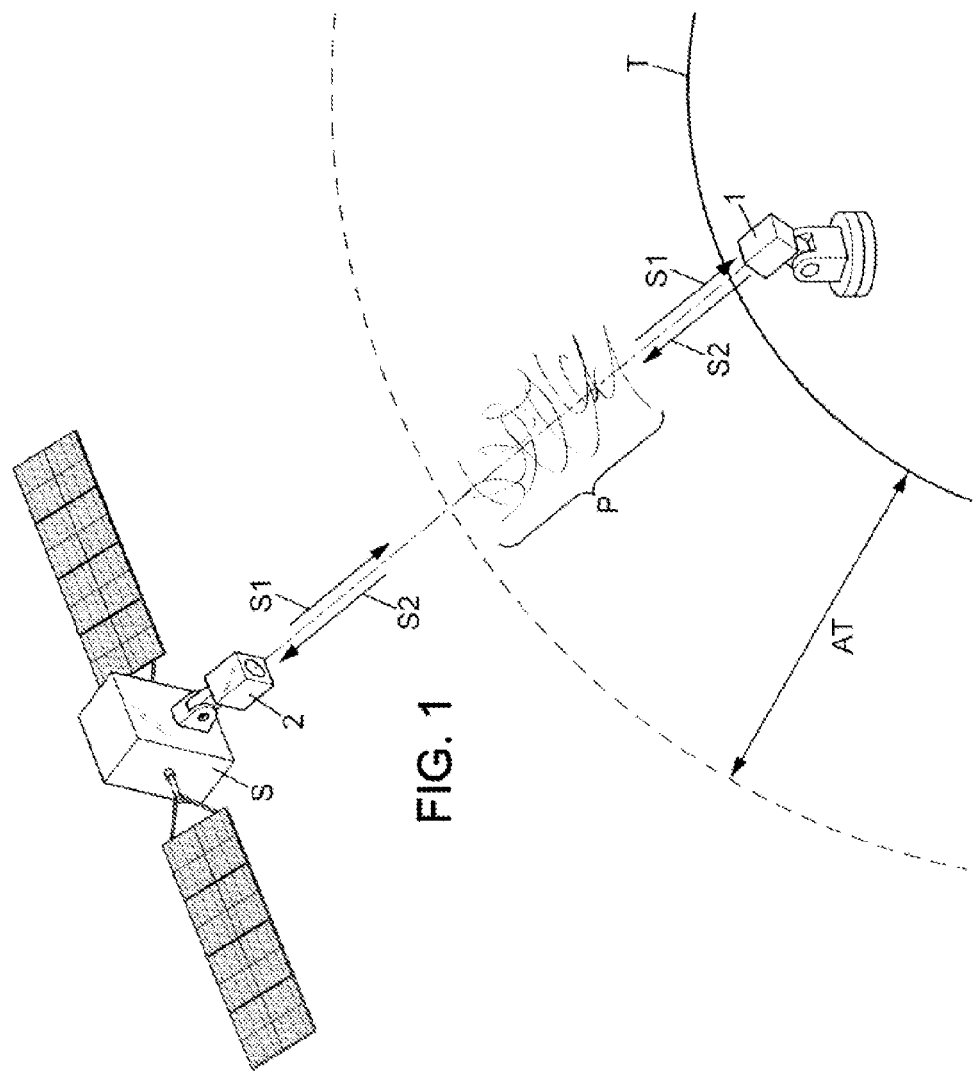
FIG. 1 schematically represents an optical communication system based on the transmission of laser signals, in which the invention can be implemented.

With reference to FIG. 1a, an optical communication system based on the free-space transmission of laser signals comprises a first terminal 1 which is located on Earth and a second terminal 2 which is located on board a satellite. The two terminals 1 and 2 may be implemented as known modules of the prior art, so it is unnecessary to repeat their structure or their operation here. Each of the two terminals 1 and 2 produces laser signals in the direction of the other terminal and each simultaneously receives signals originating from the other. The references T and S respectively denote Earth and the satellite. The satellite S may be geostationary, and may be dedicated to acting as a communication relay between another satellite, for example an observation satellite, and terminal 1 in order to send on towards the Earth the imaging data produced by the observation satellite.

The laser signals which are exchanged by terminals 1 and 2 therefore pass through the Earth's atmosphere, which is denoted AT. It is known that the atmosphere AT can interfere with the propagation of laser signals in various ways, particularly by diffusion and by deviation. Diffusion can be caused by clouds present along the signal path, and signal deviation can be caused by local variations in the temperature or in the composition of the Earth's atmosphere AT. Specifically, atmospheric turbulence, denoted P, can divert laser signals from a propagation which would be affected by diffraction only. The laser signals are then shifted relative to their initial transmission direction when they arrive at the terminal they are intended for, which disrupts their detection when received. Errors result in the information that was transmitted in binary form and received. The frequency of these errors is characterized by the bit error rate, which is the ratio of the number of bits which are received and interpreted incorrectly, to the number of bits actually sent.

Given that the atmosphere AT is closer to the terrestrial terminal 1 than to terminal 2 which is on board the satellite S, atmospheric turbulence has more effect on the laser signals sent by terminal 1 to terminal 2, than on the laser signals sent by terminal 2 to terminal 1. For this reason, it is more advantageous to implement the invention in terminal 1, but it may also be applied to terminal 2 in an identical manner. In the present description of the invention, the laser signals received by terminal 1 and originating from terminal 2 are called the first laser signals and are denoted S1, and the laser signals sent by terminal 1 to terminal 2 are called the second laser signals and are denoted S2.

It is known that a communication link based on the transmission of laser signals, commonly called a laser channel link, has a rated transmission speed which is a characteristic of the laser channel. This transmission speed, or channel speed, depends on the terminals 1 and 2 which are used, as well as on the systems for processing the transmitted information when this information is sent and received. For example, the channel speed from terminal 1 to terminal 2 may be 50 Mbps (megabits per second), or even several hundred megabits per second.

Also in a known manner, useful information in binary form is encoded for transmission between the two terminals with sufficient transmission quality, meaning with a sufficiently low bit error rate. Such encoding, which is commonly called channel encoding, consists of adding redundancy to the useful information transmitted in the laser signals. This redundancy includes the addition of parity bits in order to detect errors possibly occurring in the useful signal received after transmission. The channel transmission speed is thus shared between the payload transmission rate which corresponds to the volume of bits of useful information sent, and an encoding speed which corresponds to the bits added by the channel coding. The encoding speed therefore does not correspond to the supplemental information which would be sent in addition to the useful information, but to a redundancy in the bit stream which is sent, such that the encoding speed appears as a limitation on the payload transmission speed compared to the channel transmission speed.

The encoding rate is the ratio of the number of bits necessary to transcribe the useful information in binary form, to the total number of bits sent after encoding the same useful information. For example, a encoding rate of 4:9 means that 9 bits are sent via the laser channel for 4 bits of useful information. In other words, encoding the 4 bits of useful information has added 5 additional bits of redundancy. There are various encoding schemes available which correspond to variable encoding rates. The higher the encoding rate as defined above, the weaker the redundancy introduced by the coding. However, significant redundancy reduces the bit error rate of the transmitted useful information after this information is deencoding at the receiving terminal, under identical transmission conditions in the laser channel.

Figure 2:
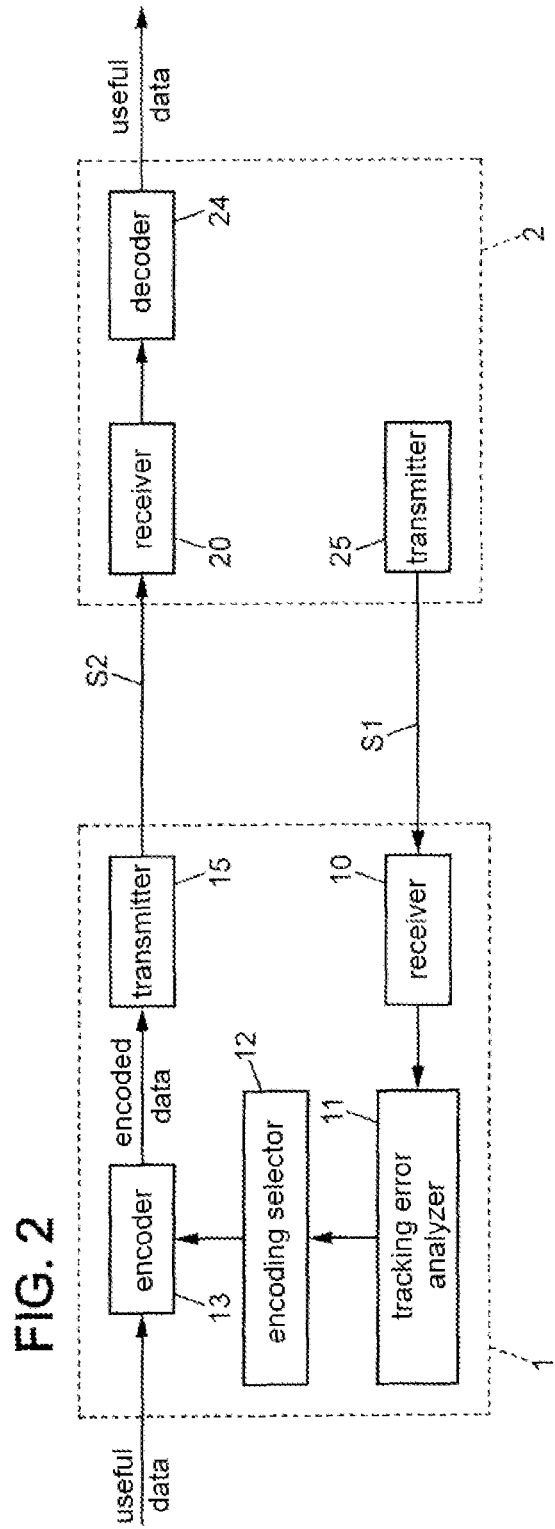
FIG. 2 illustrates functionally an implementation of the invention for the optical communication system of FIG. 1.

FIG. 2 functionally illustrates an implementation of the invention in terminal 1. It does not include elements concerned in the operation of a communication terminal based on laser signal transmission which are not modified or are not concerned by the invention, as it is understood that they are used in a manner known to a person skilled in the art.

Laser signals S1 are produced by a transmitter 25 of terminal 2.

Within terminal 1, a receiver 10 for the laser signals S1 measures, at the same time as it detects the signals S1, a reception characteristic of these signals. In particular, this reception characteristic of the signals S1 may be a reception direction of these signals, or a deviation between a reception direction of the signals and an optical axis of terminal 1. This deviation is referred to as a tracking error in the terminology of a person skilled in the art. It is also possible for the measured reception characteristic to be a combination of a received signal intensity of the laser signals S1 and of the tracking error. In addition, the received signal intensity of the signals S1 may be measured by a detector which is used for the communication, or by a detector which is used to control the pointing, usually called a tracking sensor. An analysis module 11 evaluates the amplitude of the time variations in the reception characteristic of the signals S2, for example by calculating a standard deviation of these variations. In the context of the invention, these time variations of the reception characteristic of the signals S1 are used to reveal the existence of atmospheric conditions which change the propagation of the laser signals S1. For example, the reception characteristic of the signals S1 may be measured by module 11 at a frequency of 500 Hz (hertz) or 1 kHz (kilohertz), and the amplitude of the time variations of this reception characteristic may be evaluated by module 11 at a frequency of 1 Hz or 2 Hz.

A module 12 selects the encoding rate to be used, and possibly also the type of encoding, as a function of the result of evaluating the variations in the reception characteristic which is provided by module 11. The encoding rate which is used may thus be modified with each new evaluation of the variations in the reception characteristic of the signals S1. In other words, the encoding rate may be updated by applying the invention at the same frequency as the evaluation of the time variations of the reception characteristic. Such an encoding rate adaptation frequency is compatible with the stationary state of the atmospheric disturbances P present along the path of the laser signals S1 and S2.

The encoder 13 receives a setting from module 12, which indicates the encoding rate to be used, and receives the bit stream of useful data which constitutes the payload information to be transmitted. The encoder 13 encodes the useful data then sends them to the transmitter 15 which produces the laser signals S2 in accordance with the encoded data.

The laser signals S2 are then detected by a receiver 20 of terminal 2, then decoded by a decoder 24 in order to recover the useful data on board the satellite S. The value which is used for the encoding rate for the useful data is contained in the laser signals S2, so that the decoder 24 reads this value for the encoding rate in the signals that it receives, in order to decode the useful data contained in these same signals.

For example, the encoding used can be DVB-S2 coding, for which more than ten different encoding rate values are available, between 1:5 and 9:10.

Table 1 below is an example according to the invention of the correlation between the amplitude of the time variations of the reception characteristic of the laser signals S1 and the value of the encoding rate used. The reception characteristic considered is the tracking error of terminal 1, and its time variations are evaluated by the standard deviation of its instantaneous values, calculated over successive durations of one to several seconds. This standard deviation is denoted $\sigma_{tracking}$ and is expressed in microradians (μrad). The value of the encoding rate varies according to decreasing step functions of $\sigma_{tracking}$, defined for two intervals separated by the mean intensity of the signals S1 upon their receipt by terminal 1. This mean intensity of the signals S1 is denoted P, and its numerical values are expressed in picowatts (pW). They may be calculated by module 11 at the same frequency and at the same time as the standard deviation of the tracking error.

TABLE 1

| Mean intensity (pW) | Standard deviation of the tracking error (μrad) | Encoding rate |
|---|---|---|
| P > 200 | $\sigma_{tracking} < 0.3$ | 11:15 |
| P > 200 | $0.3 < \sigma_{tracking} < 0.5$ | 2:3 |
| P > 200 | $0.5 < \sigma_{tracking} < 0.7$ | 4:9 |

TABLE 1-continued

| Mean intensity (pW) | Standard deviation of the tracking error (μrad) | Encoding rate |
|---|---|---|
| P > 200 | $0.7 < \sigma_{tracking}$ | 2:5 |
| 100 < P < 200 | $\sigma_{tracking} < 0.3$ | 4:9 |
| 100 < P < 200 | $0.3 < \sigma_{tracking} < 0.5$ | 2:5 |
| 100 < P < 200 | $0.5 < \sigma_{tracking} < 0.7$ | 1:3 |
| 100 < P < 200 | $0.7 < \sigma_{tracking}$ | 1:5 |

In preferred implementations of the invention, module 12 for selecting the encoding rate may be further adapted to select an initial value for the encoding rate which is low and which corresponds to significant redundancy in the payload information, for use at the start of a new communication session. Such a low encoding rate value ensures that the initial quality of the transmission of the payload information is good, regardless of the atmospheric conditions along the path of the laser signals S2. During the same communication session, module 12 then adjusts the encoding rate as was described above, to values which are greater than the initial value and which correspond to a subsequent redundancy which is less than the initial redundancy. In this manner, the optimized compromise of the invention between the transmission quality and the available payload transmission speed is achieved for almost the entire duration of the communication session, with no risk of the useful data being transmitted with errors at the start of the session. One can see that the expressions "low value" and "greater values" as used for the encoding rate have a comparative meaning, relative to one another, between the initial value of the encoding rate and its later values. In other words, the later values of the encoding rate are greater than the initial value.

Figure 3A:
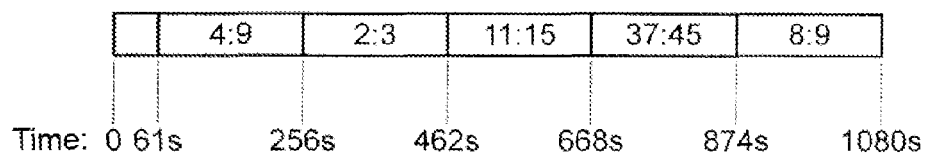
FIG. 3a represents a transmission sequence with several successive values used for the encoding rate.

As an illustration of the efficiency of the invention, the encoding rate variation sequence of FIG. 3a was conducted during a continuous transmission between terminals 1 and 2. The total duration of the sequence is 18 minutes, which is 1080 seconds, during which five different values are successively adopted for the encoding rate. These encoding rate values increase over time, from 4:9 to 8:9, corresponding to a reduction in the redundancy in the laser signals S2. During this transmission period, the received signal intensity of the laser signals S1 was measured at the tracking detector at a frequency of 10 kHz, and the mean values of this received signal intensity were calculated for successive periods of 1 second. These mean values of the received signal intensity of the signals S1 are substantially constant, approximately equal to 60 pW. This stability indicates that the transmission conditions are good and are constant, and in particular that no cloud is traveling across the path of the signals S1. The tracking error was also measured at the 10 kHz frequency, and the values of its standard deviation were calculated every second. They confirm the stability of the atmospheric conditions and the absence of any turbulence.

Figure 3B:
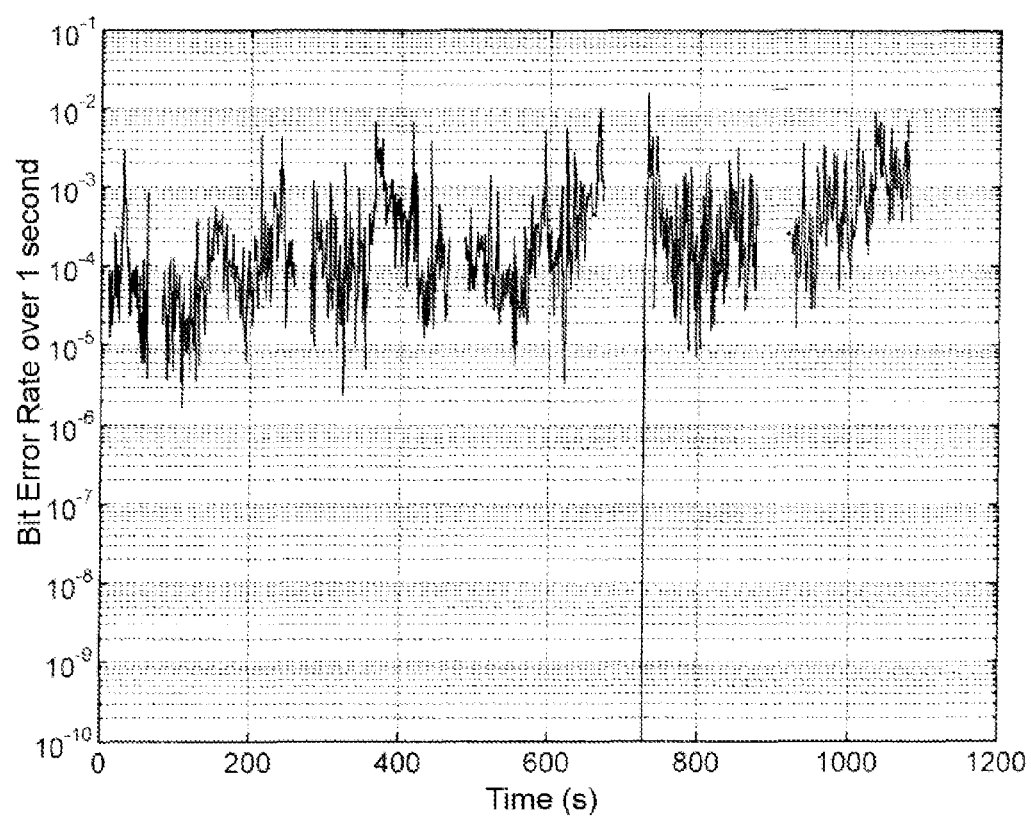

The diagram in FIG. 3b shows the evolution in the bit error rate in the signals S2 during the sequence in FIG. 3a, upon receipt of these signals S2 by the terminal 2 and before decoding. The values of this bit error rate before decoding are primarily between $10^{-3}$ and 10-5.

Figure 3C:
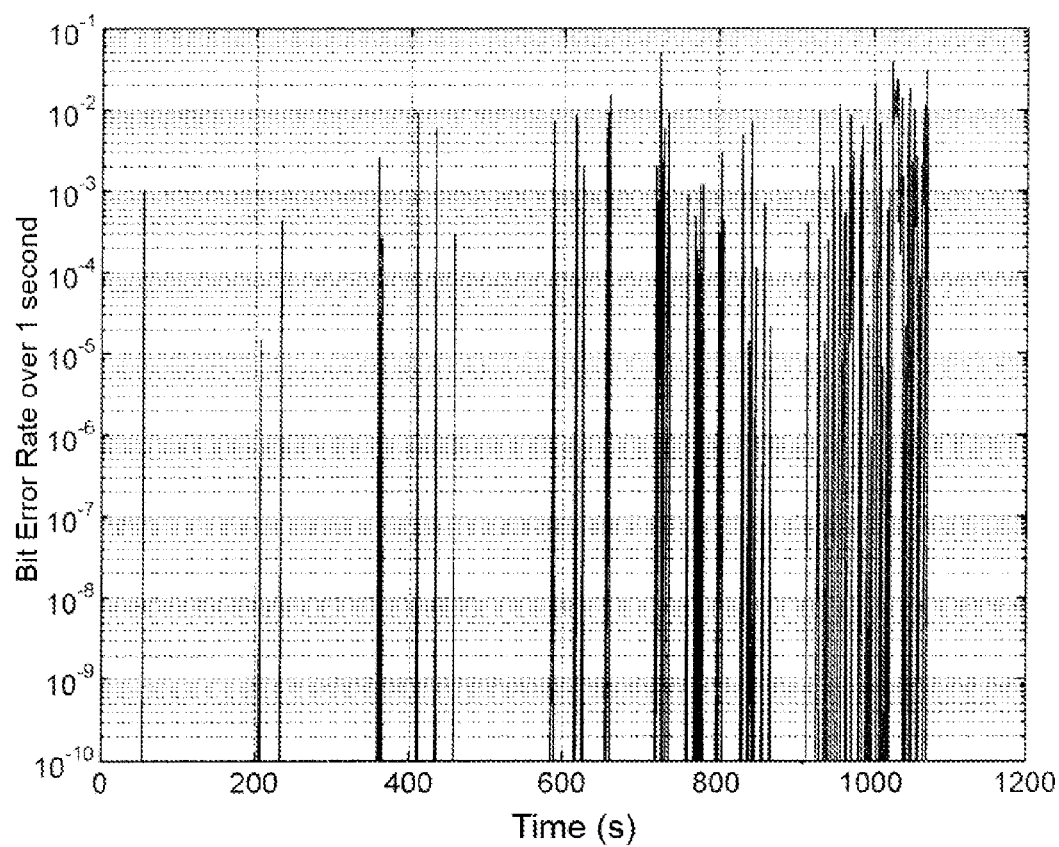

FIG. 3c corresponds to FIG. 3b, for the bit error rate in the signals S2 after they are decoded by the decoder 24. The values of this bit error rate after decoding are less than $10^{-10}$ for encoding rates 4:9, 2:3 and 11:15, except for a few isolated points. On the other hand, the bit error rate after decoding has numerous values greater than $10^{-5}$ for encoding rates 37:45 and 8:9. While the atmospheric conditions remain stable, the optimal encoding rate is therefore 11:15. In the invention, the encoding rate will be decreased relative to this value if the variations in the received signal intensity of the signals S1 and/or the standard deviation of the tracking error increase, otherwise will be increased.

Although the implementation of the invention detailed above concerns an optical communications terminal which is located on the ground, meaning at the surface of the Earth, it is understood that the invention may be applied in the same manner to an optical communications terminal which is on board an aircraft or spacecraft.

Lastly, the invention is effective for reducing transmission disruptions caused by atmospheric disturbances and by clouds, particularly cirrus clouds, or by other atmospheric phenomena present on the path of the laser signals.

The embodiments above are intended to be illustrative and not limiting. Additional embodiments may be within the claims. Although the present invention has been described with reference to particular embodiments, workers skilled in the art will recognize that changes may be made in form and detail without departing from the spirit and scope of the invention.

Various modifications to the invention may be apparent to one of skill in the art upon reading this disclosure. For example, persons of ordinary skill in the relevant art will recognize that the various features described for the different embodiments of the invention can be suitably combined, un-combined, and re-combined with other features, alone, or in different combinations, within the spirit of the invention. Likewise, the various features described above should all be regarded as example embodiments, rather than limitations to the scope or spirit of the invention. Therefore, the above is not contemplated to limit the scope of the present invention.

The invention claimed is:

1. A method for free-space optical transmission by means of laser signals, between a first and a second optical communications terminal, wherein time variations are evaluated for a reception characteristic of first laser signals which are received by the first terminal and which originate from the second terminal, and wherein a useful information to be sent by the first terminal to the second terminal is encoded before transmission, the method comprising;
   varying an encoding rate of the useful information, in second laser signals transmitted by said first terminal to said second terminal, and adjusting the encoding rate on the basis of time variations in the reception characteristic of the first laser signals,
   said encoding rate of the useful information in the second laser signals, being defined as a number of bits of the useful information before encoding, divided by the number of bits corresponding to the same useful information after encoding,
   adjusting said encoding rate of the useful information in the second laser signals according to a decreasing function of an amplitude of the time variations in the reception characteristic of the first laser signals, and
   selecting the reception characteristic of the first laser signals from among a reception direction of said first laser signals or a deviation between a reception direction of said first signals and an optical axis of the first terminal;
      wherein the reception characteristic of the first laser signals received by the first terminal is measured at a measurement frequency greater than 100 Hz, and the amplitude of the time variations in said reception characteristic of the first laser signals is evaluated at an analysis frequency of less than 10 Hz.

2. The method according to claim 1, wherein the first terminal is located on Earth or on board an aircraft which is within the Earth's atmosphere, and the second terminal is on board a spacecraft.

3. The method according to claim 1, wherein the amplitude of the time variations in the reception characteristic of the first laser signals is evaluated by calculating a standard deviation of said reception characteristic of the first laser signals.

4. The method according to claim 1, wherein the amplitude of the time variations in the reception characteristic of the first laser signals is evaluated repeatedly during a communication session, and wherein the encoding rate of the useful information in the second laser signals is adjusted in real time during said communication session.

5. The method according to claim 1, wherein the encoding rate of the useful information in the second laser signals is additionally adjusted as a function of a mean value of a received signal intensity of the first laser signals, such that said encoding rate is the same or greater when said mean value of the received signal intensity of the first laser signals is itself greater, at the same amplitude of the time variations in the reception characteristic of the first laser signals.

6. The method according to claim 1, wherein a low initial value for the encoding rate is used when starting a communication session, corresponding to a significant initial redundancy in the useful information, then the encoding rate is subsequently adjusted during said communication session to values greater than the initial value, according to the decreasing function of the amplitude of the time variations in the reception characteristic of the first laser signals, and corresponding to a subsequent redundancy which is less than said initial redundancy.

7. The method according to claim 1, wherein the second laser signals transmitted by the first terminal to the second terminal have a channel transmission rate greater than 10 Mbps, equal to the transmission rate for the useful information divided by the encoding rate.

8. An optical communications terminal for free-space transmission by means of laser signals, comprising:
 a receiver of first laser signals originating from an external terminal;
 a transmitter of second laser signals, for transmitting useful information to the external terminal;
 a module for analyzing time variations in a reception characteristic of the first laser signals;
 a module for encoding the useful information, which is able to construct the second laser signals from said useful information with a variable encoding rate; and
 a module for selecting the encoding rate of the useful information in the second laser signals, which is able to adjust said encoding rate according to a decreasing function of the amplitude of the time variations in the reception characteristic of the first laser signals, wherein
the encoding rate of the useful information in the second laser signals being defined as a number of bits of the useful information before encoding, divided by the number of bits corresponding to the same useful information after encoding,
the terminal being characterized by the reception characteristic of the first laser signals being selected from among a reception direction of said first laser signals or a deviation between the reception direction of said first signals and an optical axis of said terminal;
 wherein the module for analyzing the time variations in the reception characteristic of the first laser signals is adapted for measuring said reception characteristic at a measurement frequency greater than 100 Hz, and for producing evaluations of the amplitude of the time variations of said reception characteristic at an analysis frequency of less than 10 Hz.

9. The terminal according to claim 8, wherein the module for analyzing the time variations in the reception characteristic of the first laser signals (S1) is adapted for calculating a standard deviation of said reception characteristic of the first laser signals.

10. The terminal according to claim 8, wherein the module for analyzing the time variations in the reception characteristic of the first laser signals is adapted for evaluating the amplitude of said variations repeatedly during a communication session, and the module for selecting the encoding rate of the useful information in the second laser signals is adapted for adjusting said encoding rate in real time during said communication session.

11. The terminal according to claim 8, wherein the module for analyzing the time variations in the reception characteristic of the first laser signals is additionally adapted for producing evaluations of a mean value of the received signal intensity of said first laser signals, and the module for selecting the encoding rate of the useful information in the second laser signals is additionally adapted for adjusting said encoding rate as a function of the mean value of the received signal intensity of the first laser signals, such that said encoding rate is the same or greater when said mean value of the received signal intensity of the first laser signals is itself greater, at the same amplitude of time variations in the reception characteristic of the first laser signals.

12. The terminal according to claim 8, wherein the module for selecting the encoding rate is further adapted for selecting a low initial value for the encoding rate when starting a communication session, corresponding to a significant initial redundancy in the useful information, and for subsequently adjusting the encoding rate during said communication session to values greater than the initial value, according to the decreasing function of the amplitude of the time variations in the reception characteristic of the first laser signals, and corresponding to a subsequent redundancy which is less than said initial redundancy.

13. The terminal according to claim 8, adapted for transmitting the second laser signals towards the external terminal at a channel transmission rate greater than or equal to 10 Mbps, equal to the transmission rate for the useful information divided by the encoding rate.

14. The method according to claim 1 wherein adjusting said encoding rate of the useful information in the second laser signals according to a decreasing function, said function being a decreasing step function.

15. The terminal according to claim 8, wherein the module for selecting the encoding rate of the useful information in the second laser signals, which is able to adjust said encoding rate according to the decreasing function of the amplitude of the time variations in the reception characteristic of the first laser signals, said function being a decreasing step function.

16. A method for free-space optical transmission by means of laser signals, between a first and a second optical communications terminal, wherein time variations are evaluated for a reception characteristic of first laser signals which are received by the first terminal and which originate from the second terminal, and wherein a useful information to be sent by the first terminal to the second terminal is encoded before transmission, the method comprising;
 varying an encoding rate of the useful information, in second laser signals transmitted by said first terminal to said second terminal, and adjusting the encoding rate on the basis of time variations in the reception characteristic of the first laser signals, said encoding rate of the useful information in the second laser signals, being defined as a number of bits of the useful information before encoding, divided by the number of bits corresponding to the same useful information after encoding, adjusting said encoding rate of the useful information in the second laser signals according to a decreasing function of an amplitude of the time variations in the reception characteristic of the first laser signals, and selecting the reception characteristic of the first laser signals from among a reception direction of said first laser signals or a deviation between a reception direction of said first signals and an optical axis of the first terminal wherein the encoding rate of the useful information in the second laser signals is additionally adjusted as a function of a mean value of a received signal intensity of the first laser signals, such that said encoding rate is the same or greater when said mean value of the received signal intensity of the first laser signals is itself greater, at the same amplitude of the time variations in the reception characteristic of the first laser signals.

17. The method according to claim 16, wherein the first terminal is located on Earth or on board an aircraft which is within the Earth's atmosphere, and the second terminal is on board a spacecraft.

18. The method according to claim 16, wherein the amplitude of the time variations in the reception characteristic of the first laser signals is evaluated by calculating a standard deviation of said reception characteristic of the first laser signals.

19. The method according to claim 16, wherein the reception characteristic of the first laser signals received by the first terminal is measured at a measurement frequency greater than 100 Hz, and the amplitude of the time variations in said reception characteristic of the first laser signals is evaluated at an analysis frequency of less than 10 Hz.

20. The method according to claim 16, wherein the amplitude of the time variations in the reception characteristic of the first laser signals is evaluated repeatedly during a communication session, and wherein the encoding rate of the useful information in the second laser signals is adjusted in real time during said communication session.

21. The method according to claim 16, wherein a low initial value for the encoding rate is used when starting a communication session, corresponding to a significant initial redundancy in the useful information, then the encoding rate is subsequently adjusted during said communication session to values greater than the initial value, according to the decreasing function of the amplitude of the time variations in the reception characteristic of the first laser signals, and corresponding to a subsequent redundancy which is less than said initial redundancy.

22. The method according to claim 16, wherein the second laser signals transmitted by the first terminal to the second terminal have a channel transmission rate greater than 10 Mbps, equal to the transmission rate for the useful information divided by the encoding rate.

23. The method according to claim 16 wherein adjusting said encoding rate of the useful information in the second laser signals according to a decreasing function, said function being a decreasing step function.

24. An optical communications terminal for free-space transmission by means of laser signals, comprising:

a receiver of first laser signals originating from an external terminal;

a transmitter of second laser signals, for transmitting useful information to the external terminal;

a module for analyzing time variations in a reception characteristic of the first laser signals;

a module for encoding the useful information, which is able to construct the second laser signals from said useful information with a variable encoding rate; and a module for selecting the encoding rate of the useful information in the second laser signals, which is able to adjust said encoding rate according to a decreasing function of the amplitude of the time variations in the reception characteristic of the first laser signals, wherein the encoding rate of the useful information in the second laser signals being defined as a number of bits of the useful information before encoding, divided by the number of bits corresponding to the same useful information after encoding, the terminal being characterized by the reception characteristic of the first laser signals being selected from among a reception direction of said first laser signals or a deviation between the reception direction of said first signals and an optical axis of said terminal;

wherein the module for analyzing the time variations in the reception characteristic of the first laser signals is additionally adapted for producing evaluations of a mean value of the received signal intensity of said first laser signals, and the module for selecting the encoding rate of the useful information in the second laser signals is additionally adapted for adjusting said encoding rate as a function of the mean value of the received signal intensity of the first laser signals, such that said encoding rate is the same or greater when said mean value of the received signal intensity of the first laser signals is itself greater, at the same amplitude of time variations in the reception characteristic of the first laser signals.

25. The terminal according to claim 24, wherein the module for analyzing the time variations in the reception characteristic of the first laser signals (S1) is adapted for calculating a standard deviation of said reception characteristic of the first laser signals.

26. The terminal according to claim 24, wherein the module for analyzing the time variations in the reception characteristic of the first laser signals is adapted for measuring said reception characteristic at a measurement frequency greater than 100 Hz, and for producing evaluations of the amplitude of the time variations of said reception characteristic at an analysis frequency of less than 10 Hz.

27. The terminal according to claim 24, wherein the module for analyzing the time variations in the reception characteristic of the first laser signals is adapted for evaluating the amplitude of said variations repeatedly during a communication session, and the module for selecting the encoding rate of the useful information in the second laser signals is adapted for adjusting said encoding rate in real time during said communication session.

28. The terminal according to claim 24, wherein the module for selecting the encoding rate is further adapted for selecting a low initial value for the encoding rate when starting a communication session, corresponding to a significant initial redundancy in the useful information, and for subsequently adjusting the encoding rate during said communication session to values greater than the initial value, according to the decreasing function of the amplitude of the time variations in the reception characteristic of the first laser signals, and corresponding to a subsequent redundancy which is less than said initial redundancy.

29. The terminal according to claim 24, adapted for transmitting the second laser signals towards the external terminal at a channel transmission rate greater than or equal to 10 Mbps, equal to the transmission rate for the useful information divided by the encoding rate.

30. The terminal according to claim 24, wherein the module for selecting the encoding rate of the useful information in the second laser signals, which is able to adjust said encoding rate according to the decreasing function of the amplitude of the time variations in the reception characteristic of the first laser signals, said function being a decreasing step function.

* * * * *